May 6, 1969 N. B. MURPHY 3,442,282
SERVOVALVE
Filed Dec. 12, 1966

INVENTOR.
NORMAN B. MURPHY
BY
ATTORNEY

United States Patent Office 3,442,282
Patented May 6, 1969

3,442,282
SERVOVALVE
Norman B. Murphy, 61 Hidden Glen Road,
Upper Saddle River, N.J. 07458
Filed Dec. 12, 1966, Ser. No. 600,933
Int. Cl. F15b 5/00; G05d 16/00; E03b
U.S. Cl. 137—85                           15 Claims

ABSTRACT OF THE DISCLOSURE

A servovalve having needle valves controlling a spool fluid flow valve, with a mechanical feedback connection between the spool valve and the needle valve.

BACKGROUND

Field of the invention

The invention relates to the field of fluid powered servovalve apparatus and to improved first and second stage valve actuating means.

Description of the prior art

Servovalve operation has heretofore been subject to inherent disadvantages in the first stage because of quiescent leakage, metering orifice sensitivity to contamination variations in first stage gain and bias due to temperature change. Second stage metering spools have been spring restrained which presents stability problems.

In particular, the nozzle flapper type servovalve requires a constant fluid flow which is impinged by the flapper such that at null or non-operational conditions the back pressure on the two nozzles is calculated to be equal so that there is no differential pressure applied to the spool. In this type of valve, however, metering orifices are required ahead of the nozzles to limit the flow to a control spool or another stage and provide the necessary pressure drop.

In such prior art type servovalve systems, in the event of silting or other contamination, the pressure drop varies in one nozzle with respect to the other so that a resultant differential pressure change is applied to the spool resulting in a change of spool position causing flow to a ram controlled thereby. In this connection, in the servovalve system disclosed in U.S. Patent No. 3,257,911, granted June 28, 1966 to K. D. Garnjost et al., there are included redundant flapper valves to in effect decrease the probability of failure, in that the probability that adverse conditions may occur on all of the redundant valves at the same time is unlikely, nevertheless, each redundant valve in the arrangement of the Garnjost et al. patent remains subject to contamination and adverse temperature effects.

Similar problems are experienced with the receiver ports of the prior art type "jet pipe" valves. In the present invention there is no "suspended" first stage member such as flapper to nozzles or jet pipe to receiver ports. Therefore, thermal changes have no effect on control valve position. The control valves of the present invention operate in an on-off manner; they are self-cleaning when unseated and are seated in null position; there is no quiescent leakage; drag friction due to fluid contamination of the metering spool is negligible with respect to full system pressure which acts as the positioning force on the spool for all input signals. There are no metering orifices in the system and therefore orifice contamination is not present. Furthermore, the metering spool is not spring restrained so as to provide for a large increase, compared with the conventional arrangement, of the natural frequency of the metering spool.

SUMMARY

It is within the contemplation of this invention to provide a servovalve to control fluid flow to a ram or piston surface dependent upon a displacement of a second stage control means, the latter being responsive to an actuating means and error signal appearing thereto.

Further, it is an object of this invention to provide, in a two stage servovalve, a first stage which operates in an on-off manner which is not subject to contamination or temperature effects at null position.

Another object of the invention is to provide a two stage valve wherein the first stage operates in an on-off manner and provides full system pressure to the second stage.

Another object of the invention is to provide a two stage valve wherein the second stage metering spool operates under full system pressure so as to render negligible the adverse drag response effect of fluid sludge contamination on the metering spool.

Another object of the invention is to provide a servovalve apparatus to provide a fluid flow to a ram or piston which is linearly proportional to an error signal driving a motor for causing a displacement of linkage to control movement of valves controlling pressure applied to a spool valve which in turn effects the fluid flow to the ram or piston which may be operatively connected to an airfoil or aircraft control surface.

A further object is to provide a two stage valve wherein the second stage allows full system pressure fluid flow linearly proportional to a linear displacement caused by an error signal.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

DESCRIPTION OF THE INVENTION

Figure 1:
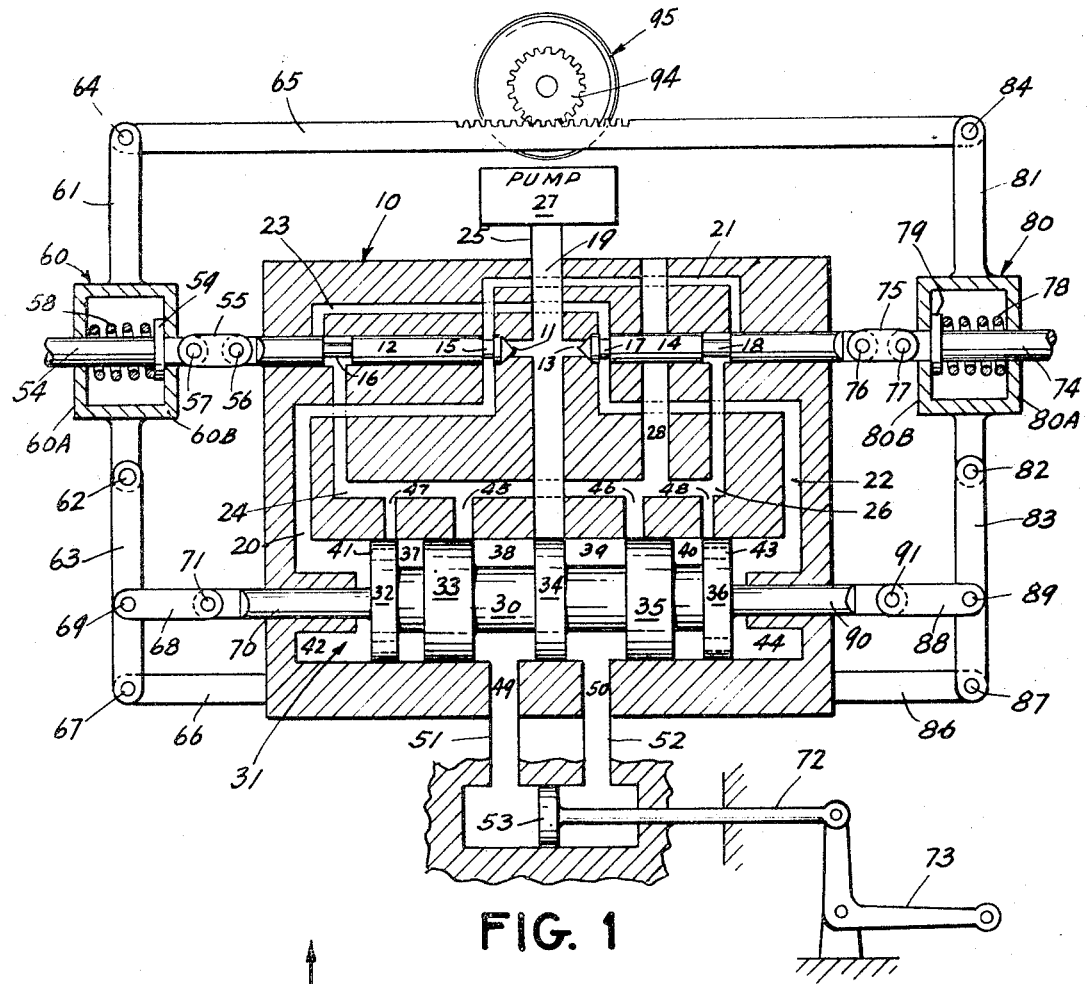
FIGURE 1 is a cross-sectional schematic view of a servovalve apparatus embodying the present invention.

Referring to FIGURE 1, the servovalve apparatus 10 is shown in a null position in which needle valves 12 and 14 of a first stage valve means are shown in a seated position relative to valve ports 11 and 13 leading from a pressure conduit 19 which is connected through a conduit 25 to a suitable source of fluid pressure, such as a pump 27. The needle valve 12 has undercut sections at 15 and 16 and needle valve 14 has undercut sections at 17 and 18.

The undercut section 15 of needle valve 12 is positioned in cooperative relation to open ends of passages 20 and 21 provided in the servo valve apparatus 10 so as to permit the flow of a fluid pressure medium from the one to the other passage upon the needle valve 12 being in a seated position while the undercut section 17 of needle valve 14 is positioned in cooperative relation to open ends of passages 22 and 23 provided in the servovalve apparatus 10 so as to permit the flow of a fluid pressure medium from the one to the other passage upon the needle valve 14 being in a seated position.

The undercut section 16 of needle valve 12 allows fluid flow from an open end of the passage 23 through an open end of a drain passage 24 upon the undercut section 16 of valve 12 being in a position adjacent to the open ends of both passage 23 and drain passage 24 while the undercut section 18 of needle valve 14 allows fluid flow from an open end of the passage 21 through an open end of a drain passage 26 upon the undercut section 18 of valve 14 being in a position adjacent to the open ends of both passage 21 and drain passage 26. Drain passages 24 and 26 are directly connected to a drain conduit generally indicated at 28.

The servovalve apparatus 10 includes a metering spool valve 30 of a second stage valve means slidably mounted in a valve chamber 31 and having lands 32, 33, 34, 35 and 36 which are arranged in spaced relation so as to define a chamber 37 at an undercut portion of spool valve 30 between lands 32 and 33, a chamber 38 at an undercut portion of spool valve 30 between lands 33 and 34, a chamber 39 at an undercut portion of spool valve 30 between lands 34 and 35, and a chamber 40 at an undercut portion of spool valve 30 between lands 35 and 36.

The chamber 37 is connected by ports 41 extending through land 32 to a chamber 42 in the valve chamber 31 at one end of the spool valve 30 and the chamber 40 is connected by ports 43 extending through land 36 to a chamber 44 in the valve chamber 31 at an opposite end of the spool valve 30. The ports 41 and 43 serve a purpose to be explained hereinafter.

The land 33, as shown in FIGURE 1, is arranged in cooperative relation adjacent to an end of a passageway 45 opening into the chamber 38 and leading to the drain passage 24. The land 33 is arranged to open and close the passageway 45 leading from the chamber 38 into the drain passage 24. Similarly, the land 35 is shown arranged in cooperative relation adjacent to an end of a passageway 46 opening into the chamber 39 and leading to the drain passage 24. The land 35 is arranged to open and close the passageway 46 which leads from the chamber 30 into the drain passage 24.

The land 32 is shown arranged in cooperative relation adjacent to an end of a passageway 47 opening into the chamber 37 and leading to the drain passage 24. The land 32 is arranged to open and close the open end of passageway 47 which leads from the chamber 37 into the drain passageway 24. Similarly, land 36 is shown arranged in cooperative relation adjacent to an end of a passageway 48 opening into the chamber 40 and is arranged to open and close the open end of passageway 48 which leads from the chamber 40 into the drain passageway 26.

The land 34 at the null position, as shown in the FIGURE 1, is arranged in cooperative relation adjacent to an open end of the pressure source passageway 19 so as to close the same. The arrangement of the land 34 is such as to open the end of the passageway 19 in relation to the chamber 38 upon the spool 30 being slidably adjusted to the right of the position shown by FIGURE 1 or to open the end of the passageway 19 in relation to the chamber 39 upon the spool 30 being slidably adjusted to the left of the position shown.

Ports 49 and 50 opening from the chambers 38 and 39, respectively, of the spool valve 30 are connected by conduits 51 and 52 to opposite sides of a ram or piston 53 from which projects an actuating rod 72 which may be operatively connected to an airfoil surface 73 of an aircraft as indicated diagrammatically by FIGURE 1.

The chambers 42 and 44 providel in the valve chamber 31 at opposite ends of the metering spool valve 30 are connected to passageways 20 and 22, respectively, which in turn open through undercut sections 15 and 17 of the needle valves 12 and 14 into passages 21 and 23, respectively, the fluid flow through which to the drain passages 26 and 24 being controlled by the undercut sections 18 and 16 of the needle valves 14 and 12, as heretofore explained, and for a purpose which will be explained in greater detail hereinafter.

The needle valve 12 is pivotally coupled to an actuating rod 54 by a link 55 which is connected to the needle valve 12 by a pin 56 and to the actuating rod 54 by a pin 57 so as to provide axial movement of the needle valve 12 within the servo valve apparatus 10 and a mechanical coupling between the needle valve 12 and a linkage arm 61.

The actuating rod 54 has a spring 58 coaxial therewith and a flange 59 transversely fixed on the rod 54. The spring 58 and the flange 59 are mounted between opposite arms 60A and 60B of a bracket 60 carried by the linkage arm 61 intermediate opposite ends thereof. A pivot pin 62 attaches one end of the linkage arm 61 with one end of a linkage arm 63.

The pivot end 62 of the arm 61 may be positioned to the right from that shown in FIGURE 1 to thereby apply through the compressed spring 58 a biasing force to the needle valve 12 in a seating sense in relation to the valve port 11. A pivot pin 64 attaches an opposite end of the linkage arm 61 to an end of a ratchet bar 65. The needle valve 12 may be actuated out of the seated position upon a longitudinal movement of the ratchet bar 65 to the left of the null position shown by FIGURE 1 and withdrawal of the compressive force applied by the spring 58 so as to cause engagement of the flange 59 by the arm 60B to lift the valve 12 out of a seating relation to the valve port 11.

A link 66 is fixedly attached at one end of a base of the servo valve apparatus 10 and has pivotally connected thereto by a pivot pin 67 an opposite end of the link 63. The link 63 is pivotally connected by a pin 69 at a point intermediate the pivots 62 and 67 to one end of a link 68, which is in turn connected at an opposite end by a pin 71 to a free end of an actuating rod 70 attached to the left side of spool valve 30 so that there may be effected an axial movement of the rod 70 within the servo valve apparatus 10 and a mechanical coupling between the spool valve 30 and the linkage arm 63 upon movement of the spool valve 30.

The needle valve 14 is pivotally coupled to an actuating rod 74 by a link 75 which is connected to the needle valve 14 by a pin 76 and to the actuating rod 74 by a pin 77 so as to provide axial movement of the needle valve 14 within the servo valve apparatus 10 and a mechanical coupling between the needle valve 14 and a linkage arm 81.

The actuating rod 74 has a spring 78 coaxial therewith and a flange 79 transversely fixed on the rod 74. The spring 78 and the flange 79 are mounted between opposite arms 80A and 80B of a bracket 80 carried by the linkage arm 81 intermediate opposite ends thereof. A pivot pin 82 attaches one end of the linkage arm 81 with one end of a linkage arm 83.

The pivot end 82 of the arm 81 may be positioned to the left from that shown in FIGURE 1 to thereby apply through the compressed spring 78 a biasing force to the needle valve 14 in a seating sense relation to the valve port 13. A pivot pin 84 attaches an opposite end of the linkage arm 81 to an end of a ratchet bar 65. The needle valve 14 may be actuated out of the seated position upon a longitudinal movement of the ratchet bar 65 to the right of the null position shown by FIGURE 1 and withdrawal of the compressive force applied by the spring 78 so as to cause engagement of the flange 79 by the arm 80B to lift the valve 14 out of a seating relation to the valve port 13.

A link 86 is fixedly attached at one end of a base of the servovalve apparatus 10 and has pivotally connected thereto by a pivot pin 87 an opposite end of the link 83. The link 83 is pivotally connected by a pin 89 at a point intermediate the pivots 82 and 87 to one end of a link 88, which is in turn connected at an opposite end by a pin 91 to a free end of an actuating rod 90 attached to the right side of spool valve 30 so that there may be effected an axial movement of the rod 90 within the servovalve apparatus 10 and a mechanical coupling between the spool valve 30 and the linkage arm 83 upon movement of the spool valve 30.

The ratchet bar 65 is shown in a gear toothed engagement with a gear 94 rotatably driven by a servomotor of a conventional type with a displacement proportional to input current to drive the gear 95 directly.

OPERATION

In operation, with reference to FIGURE 1, servomotor 95 causes gear 94 driven thereby to rotate an angular distance or arc length proportional to a command error signal and the gear 94 drives or longitudinally moves the ratchet bar 65 to the right or left of the position shown depending upon the direction of rotation of gear 94. At a null position which is shown in FIGURE 1, valves 12 and 14 are shown seated in the valve ports 11 and 13 in which position no signal drives gear 94 of motor 95 and there is no fluid flow to either end of the metering spool valve 30.

Further, needle valves 12 and 14 are coupled through mechanical differential linkage to the metering spool valve 30 to provide a mechanical follow up, as hereafter more fully explained.

When servomotor 95 drives gear 94 in a clockwise direction, for example, the ratchet bar 65 will be longitudinally actuated to the left so that needle valve 12 will be withdrawn from its valve seat 11 permitting fluid to be ported under pressure from the passage 19 through passage 20 to the left chamber 42 of the metering spool valve 30. Simultaneously the right chamber 44 of the metering spool valve 30 is connected to drain conduit 28 via passageway 22, undercut section 17 of valve 14, passage 23 and undercut section 16 of valve 12, undercut section 16 having moved adjacent to both the openings of passageway 23 and drain passageway 24 of drain conduit 28.

During this phase of the operation, needle valve 14 remains seated because of lost motion as spring 78 is compressed in the bracket 80 above its preload value since the longitudinal actuation of the ratchet bar 65 to the left will cause the linkage arm 81 to pivot about pin 82 and be thereby effectively displaced to the left of its null position.

The resulting increase in the fluid pressure in chamber 42 causes the metering spool valve 30 to slide to the right. Upon the metering spool valve 30 being positioned to the right, the extreme right land 36 opens passageway 48 providing thereby a redundant drain path from chamber 44 through port 43, chamber 40 and passageway 48 to the drain passageway 26 leading to the drain conduit 28. Upon the metering spool valve 30 being positioned to the right, land 34 opens the pressure source passageway 19 causing flow of fluid from supply pressure conduit 19 to the chamber 38 defined by the undercut section of spool valve 30 between lands 33 and 34, and through port 49 and conduit 51 to one end of the ram 53.

Simultaneously, port 50 leading from the other end of ram 53 is opened to drain because chamber 39 defined by undercut section of spool valve 30 between lands 34 and 35 is opened to the passageway 46 which is connected to drain passageway 24 of drain conduit 28 thus relieving the other end of the ram 53 of entrapped fluid. As the spool valve 30 moves to the right, the pivot point 62 is displaced to the right as linkage arm 63 is caused to pivot about fixed pivot 67, since the actuating rod 70 and link 68 move to the right with the spool valve 30.

Similarly when servomotor 95 rotates in a counterclockwise direction, the ratchet rod 65 is displaced to the right causing linkage arm 81 to pivot about pivot pin 82 so that bracket 80 forces flange 79 to the right to in turn cause needle valve 14 to become unseated with respect to valve port 13 to allow full pressure fluid flow through conduit 22 to chamber 44 while simultaneously connecting chamber 42 to drain passage 26 via conduit 20, undercut section 15 of valve 12, conduit 21 and undercut section 18 of valve 14. The undercut section 18 of the valve 14 is positioned by the opening of the valve 14 to a position adjacent to the opening of passageway 21 and drain passageway 26 of drain 28.

The pressure of the fluid in chamber 44 forces the metering spool valve 30 to slide to the left and at the left the land 32 opens passageway 47 to chamber 37 providing thereby a redundant drain path from chamber 42 through port 41, chamber 37 and passageway 47 to drain passageway 24 of the drain conduit 28. Upon the metering spool valve 30 being so positioned the other end of ram 53 through conduit 52 and port 50 is open to full system pressure. The fluid pressure is applied through chamber 39 defined by the undercut section of spool valve 30 between lands 34 and 35 which is positioned simultaneously adjacent to the opening of the pressure source conduit 19 and port 50. Thus one end of ram 53 through conduit 51 and port 49 is opened to drain passageway 24 via chamber 38 defined by the undercut section of spool 30 between lands 33 and 34. The chamber 38 is positioned simultaneously adjacent to the opening to passageway 45 so as to connect the port 49 to the drain passageway 24 of drain 28.

The linkage operation, in particular, operates when servomotor 95 turns gear 94 in either direction to effect operation of the ratchet bar 65. The resulting linear displacement of the ratchet bar 65 is proportional to the angular rotation of gear 94. If gear 94 of motor 95 turns in a clockwise direction, ratchet bar 65 is driven to the left of the null position of FIGURE 1 while linkage arm 61 pivots instantaneously about point 62 causing flange 59 bearing against arm 60B of the bracket 60 to move to the left which unseats needle valve 12 so as to provide full supply pressure from conduit 19 through passageway 20 to appear in chamber 42 at the left of spool valve 30 to drive spool valve 30 to the right of the position shown in FIGURE 1.

The displacement of the ratchet bar 65 to the left causes displacement of pivot 84 to the left and linkage arm 81 to pivot about pivot point 82 forcing arm 80A of the bracket 80 to compress spring 78 so that needle valve 14 remains seated in port 13 under the biasing force of the compressed spring 78.

Movement of the spool valve 30 to the right displaces pivot point 62 to the right as the actuating rod 70 and link 68 are effectively moved to the right by the spool valve 30 causing linkage arm 63 to pivot about the fixed pivot pin 67, whereupon the linkage arm 61 pivotally attached to linkage arm 63 at pivot pin 62 follows up and causes arm 60A of bracket 60 to compress spring 58 against flange 59 to absorb last motion and act through the actuating rod 54 and link 55 to reseat needle valve 12 in valve port 11.

Simultaneously, movement of the spool valve 30 to the right displaces pivot point 82 to the right as the actuating rod 90 and link 88 move to the right causing linkage arm 83 to pivot to the right about fixed point 87 which action relieves the compression of 78, but which leaves needle valve 14 seated in port 13. At this stage if the error signal still appears, pivot point 64 connecting ratchet bar 65 with linkage arm 61 remains to the left of its null position and both needle valves 12 and 14 are seated while the spool valve 30 is positioned to the right of null position whereupon the one side of the ram 53 through chamber 38, port 49 and conduit 51 is connected to the full fluid supply pressure applied from passage 19, while the other side of the ram 53 is connected through conduit 52, port 50, chamber 39 and passageway 46 to the drain passage 24.

Upon the error signal being reversed, ratchet bar 65 is returned to null position by motor 95 turning gear 94 counterclockwise and linkage arm 61 pivots about pivot point 62 to cause arm 60A of the bracket 60 to further compress spring 58, while linkage arm 81 pivots about point 82 which being positioned to the right of null position causes arm 80B of the bracket 80 and flange 79 acting through link 75 to momentarily unseat needle valve 14 from port 13 allowing the supply of fluid pressure from conduit 19 through passageway 22 to chamber 44 to drive spool valve 30 to the left and the follow up rod 90 and linkage 88, 83 and 81 to be returned to the null position thereby reseating needle valve 14 in port 13.

As the spool valve 30 moves from right to left and back to the null position, the rod 70 and link 68 cause linkage arm 63 to pivot about pivot point 67 back to null position. Thereupon the arm 61 pivotally attached by pin 62 to linkage arm 63 is forced back to a null position relieving the compression of spring 58.

Similarly upon motor 95 turning gear 94 in a counter-clockwise direction, the ratchet bar 65 is driven to the right of the null position to effect an opposite operation of the valves 14 and 12 through the operating linkage provided, as will be readily apparent.

Figure 2:
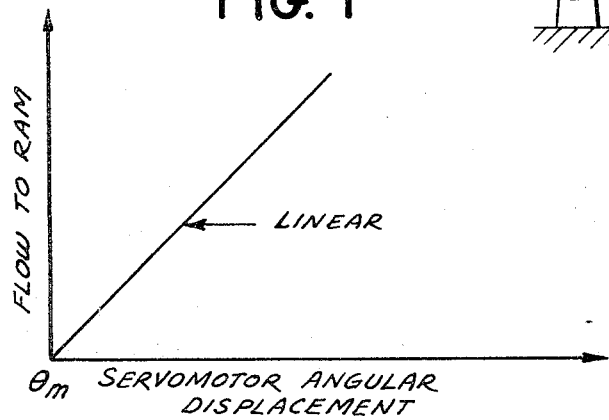
FIGURE 2 is a graphical illustration of static functional requirements of the valve apparatus embodying the present invention.

FIGURE 2 shows the graph of fluid flow from the pressure source 27 to the ram 53 as a function of the angular displacement $\theta$ in radians of gear 94 of servomotor 95.

The fluid flow to ram 53 is linearly proportional to the metering spool valve 30 displacement from null position and the latter is linearly proportional to the angular displacement of the servomotor 95. Therefore the fluid flow from pressure source 27 is linearly proportional to the angular displacement of the gear 94 of servomotor 95.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a fluid powdered servovalve apparatus, the combination compirsing:
   input actuating means responsive to a command signal;
   first stage needle valve means;
   last motion connecting means to operatively couple the input actuating means to the first stage needle valve means;
   second stage fluid flow control means;
   other connecting means to operatively couple the second stage fluid flow control means to the first stage needle valve means via said last motion connecting means; and
   fluid pressure conduit means operatively connecting the first stage needle valve means to the second stage fluid flow control means;
   the first stage needle valve means being selectively operable in open and closed senses;
   the first stage needle valve means being operable in said open sense to pass a fluid pressure medium through said fluid pressure conduit means to operate said second stage control means; and
   the first stage needle valve means being operable in said closed sense to prevent said fluid pressure medium from flowing through said conduit means;
   the second stage fluid flow control means being slidably positioned in response to the fluid pressure medium passing through the first stage needle valve means and operative to effect flow of a fluid pressure medium to position a ram upon the command signal effecting a displacement of the actuating means in response thereto; and
   the other connecting means being operative upon the second stage control means being slidably positioned to effect a follow up action by repositioning the first stage needle valve means in a closing sense following the positioning of the first stage needle valve means in an open sense by the operation of the actuating means.

2. A servovalve apparatus as defined by claim 1, wherein the input actuating means includes:
   a rotary type servomotor which converts electrical commands to mechanically motion;
   a control bar displaced by mechanical motion of the servomotor; and
   first and second control links pivotally connected to opposite ends of the control bar for positioning the first stage needle valve means in said open and closed senses.

3. A servovalve apparatus as defined by claim 2, wherein the second stage fluid flow control means comprises:
   a fluid pressure metering spool valve having undercut sections;
   the metering spool valve being slidably positioned within the servovalve apparatus; and
   first and second fluid pressure chambers associated with the fluid pressure metering spool valve;
   the fluid pressure in said chambers being affected by the fluid pressure medium passing through the fluid pressure conduit means operatively connecting the first stage needle valve means to the spool valve;

4. A servovalve apparatus as defined by claim 3, wherein the first stage needle valve means includes:
   a pair of needle valves to control said fluid pressure conduit means;
   each needle valve being mechanically coupled to an actuating rod; and
   spring means coupling each actuating rod to one of said control links;
   the spring means being compressed by displacement of the control links of the actuating means in a needle valve closing sense; and
   each of the needle valves being selectively operative to open and closed positions;
   said needle valves being arranged so as to provide passage of a fluid pressure medium through the conduit means upon one of the needle valves being in an open position and preventing passage of the fluid pressure medium through the conduit means upon both of the needle valves being in a closed position; and
   the needle valves cooperating in said conduit means to cause a flow of the fluid pressure medium in the conduit means to selectively control the fluid pressure in the pressure chambers at opposite ends of the metering spool valve to effectively position the metering spool valve upon one of said needle valves being in said open position.

5. The servovalve apparatus as defined by claim 4 wherein the other connecting means comprises:
   linkage means for operatively connecting the opposite ends of the metering spool valve to the first and second control links of the actuating means so as to effect the follow up action by the repositioning of one of said needle valves in a closed position upon said one needle valve being in said open position.

6. A servovalve appartus as defined in claim 4 including:
   one of said pair of needle valves being selectively operable to said open position in response to displacement of the control bar of the actuating means in one sense to effect flow of a fluid pressure medium through the fluid pressure conduit means to the first chamber at one end of the metering spool valve and to permit flow of a fluid pressure medium from the second chamber at the opposite end of the metering spool valve so as to slidably position the metering spool valve in one direction; and
   the other of said pair of needle valves being selectively operable to said open position in response to displacement of the control bar of the actuating means in an opposite sense to effect flow of a fluid pressure medium to the second chamber at the opposite end of the metering spool valve and from the first chamber at said one end of the metering spool valve so as to slidably position the spool valve in an opposite direction.

7. The servovalve apparatus as defined by claim 4 including:
   one of said pair of needle valves being selectively operable to an open position and to a closed position in response to displacement of the control bar to effectively control flow of the fluid pressure medium through the fluid pressure conduit means to the fluid pressure chambers of the fluid pressure metering spool valve so that upon said one needle valve being actuated to an open position and the other of the needle valves being in a closed position the metering spool valve may be positioned in one direction;

the metering spool valve being responsive to the fluid flow through said fluid pressure conduit means to simultaneously cause a fluid pressure medium to be applied so as to effectively position the ram so long as the command signal be applied to the input actuating means; and thereafter upon the other of said needle valves being actuated to an open position and said one needle valve being in a close position the pressurized fluid flow may be applied in an opposite sense through the fluid pressure conduit means to the fluid pressure chambers of the metering spool valve so as to slidably position the metering spool valve in an opposite direction and simultaneously terminate the application of the fluid pressure medium to the ram.

8. A servovalve apparatus as defined by claim 4 including:

one of said pair of needle valves being selectively operable to an open position and to a closed position in response to displacement of the control bar to effectively control flow of the fluid pressure medium through the fluid pressure conduit means to the fluid pressure chambers of the fluid pressure metering spool valve so that upon one of the needle valves being actuated to an open position and the other of the needle valves being in a closed position the metering spool valve may be slidably positioned in one direction;

said metering spool valve being responsive to the fluid flow through said fluid pressure conduit means to cause the other connecting means to effect the follow up action and the repositioning of said one needle valve to the closed position while simultaneously the metering spool valve causes a fluid pressure medium to be applied so as to effectively position the ram so long as the command signal be applied to the input actuating means; and thereafter upon the other of said pair of needle valves being actuated to an open position and said one needle valve being in a closed position the pressurized fluid flow may be applied in an opposite sense through the fluid pressure conduit means to fluid pressure chambers of the second stage fluid flow control means so as to slidably position the metering spool valve in an opposite direction so as to cause the other connecting means to effect the follow up and repositioning of the second needle valve to a closed position while simultaneously terminating the application of the fluid pressure medium to the ram.

9. In a fluid powered servovalve apparatus, the combination comprising:

a rotary type servomotor which converts electrical commands to mechanical motion;

a control bar displaced by mechanical motion of the servomotor;

first and second control links pivotally connected to opposite ends of the control bar;

first stage control valve means connected to the control links;

second stage fluid flow control means;

connecting means operatively coupling the second stage fluid flow control means to the control links;

fluid pressure conduit means operatively connecting the first stage valve means to the second stage fluid flow control means;

resilient bracket means between the control links and the first stage valve means;

the first and second control links being displaced by linear displacement of the control bar;

the first stage valve means being selectively operable in an open sense to pass a fluid pressure medium through said fluid pressure conduit means to operate said second stage fluid flow control means; and in a closed sense to prevent said fluid pressure medium from flowing through said conduit means;

the second stage fluid flow control means being positioned in response to the fluid pressure medium passing through the first stage valve means and operative to effect flow of a fluid pressure medium to a ram upon the command signal effecting a displacement of the actuating means in response thereto and to impart a follow up action through the connecting means, the resilient bracket means and the control links to reposition the first stage valve means in a closing sense.

10. A servovalve apparatus as defined by claim 9, wherein the second stage fluid flow control means comprises:

a fluid pressure metering spool valve having a first undercut section defined by a first land arranged to control a first fluid pressure exhaust passage leading from the first undercut section of the metering spool valve; and a second undercut section defined by a second land arranged to control a second fluid pressure exhaust passage leading from the second undercut section of the metering spool valve;

first and second fluid pressure chambers associated with the fluid pressure metering spool valve;

said first land having a first passageway therethrough extending from the first chamber through said first land to said first undercut section;

said second land having a second passageway extending therethrough from said second chamber to said second undercut section;

the metering spool valve being movable in one direction from a position closing said first exhaust passage to a position allowing fluid passage to the first exhaust passage; and the metering spool valve being movable in an opposite direction from a position closing said second exhaust passage to a position allowing fluid passage to the second exhaust passage.

11. In a fluid powered servovalve apparatus, the combination comprising:

a rotary type servomotor which converts command signals to mechanical motion;

a control bar displaced by the mechanical motion of the servomotor;

first and second control links pivotally connected to opposite ends of the control bar;

a pair of needle valves;

lost motion means connecting the control links to the needle valves to selectively actuate said pair of needle valves to open and closed position;

a fluid pressure metering spool valve for controlling flow of a fluid pressure medium;

first and second fluid pressure chambers associated with the fluid pressure metering spool valve;

fluid pressure conduit means operatively connecting the pair of needle valves to the fluid pressure chambers;

the needle valves being arranged to selectively allow passage of fluid pressure through the conduit means to one of the fluid pressure chambers while preventing passage of fluid pressure to the second fluid pressure chamber to position the fluid pressure metering spool valve to apply the fluid pressure medium to a device while the actuating means is displaced; and connecting means for operatively connecting the fluid pressure metering spool valve to the lost motion means to affect a follow up action by repositioning the needle valve to a closed position when the metering spool valve responds to a difference in the fluid pressure medium in the pressure chambers.

12. The improvement defined by claim 11 wherein each of the needle valves includes:
  an undercut section for controlling passage of the fluid pressure medium from one of the pressure chambers to a drain;
  upon one of said needle valves being selectively actuated to the open position the undercut section of said one needle valve being effective to allow the flow of a fluid medium through the conduit means from one of said pressure chambers to said drain while passage of the fluid pressure medium is provided through the conduit means to the other pressure chamber by the open position of said one needle valve; and
  upon the other of said needle valves being selectively actuated to the open position the undercut section of the other needle valve being effective to allow flow of a fluid medium through the conduit means from the other of said pressure chambers to said drain while the passage of the fluid pressure medium is provided through the conduit means to said one pressure chamber by the open position of said other needle valve.

13. The improvement defined by claim 11 wherein the fluid pressure metering spool valve includes:
  a first undercut section defined by a first land;
  the first land being arranged to control a first fluid pressure exhaust passage leading from the first undercut section of the metering spool valve;
  a second undercut section defined by a second land;
  the second land being arranged to control a second fluid pressure exhaust passage leading from the second undercut section of the metering spool valve;
  said first land having a first passageway therethrough extending from the first chamber through said first land to said first undercut section; and
  said second land having a second passageway extending therethrough from said second chamber to said second undercut section;
  the metering spool valve being movable in one direction from a position closing said first exhaust passage to a position allowing fluid passage to the first exhaust passage; and
  the metering spool valve being movable in an opposite direction from a position closing said second exhaust passage to a position allowing fluid passage to the second exhaust passage.

14. The improvement defined by claim 11 wherein each of the first and second control links includes:
  means pivotally connecting each control link to an opposite end of the control bar;
  other means pivotally connecting each control link to said connecting means; and
  the lost motion means includes:
  resilient bracket means between each of the control links and the needle valves;
  the first and second control links being displaced by linear displacement of the control bar;
  the first and second control links being displaced by movement of the connecting means; and
  the resilient bracket means being operative to couple the control links to said pair of needle valves and to control the repositioning of said needle valves imparted by the metering spool valve through the connecting means.

15. The improvement defined by claim 14 wherein each of the needle valves include:
  an undercut section for controlling passage of the fluid pressure medium from one of the pressure chambers to a drain;
  upon one of said needle valves being selectively actuated to the open position the undercut section of said one needle valve is effective to allow the flow of a fluid medium through the conduit means from one of said pressure chambers to said drain while passage of the fluid pressure medium is provided through the conduit means to the other pressure chamber by the open position of said one needle valve; and
  upon the other of said needle valves being selectively actuated to the open position the undercut section of the other needle valve is effective to allow flow of fluid medium through the conduit means from the other of said pressure chambers to said drain while the passage of the fluid pressure medium is provided through the conduit means to said one pressure chamber by the open position of said other needle valve; and
  the fluid pressure metering spool valve includes:
  a first undercut section defined by a first land;
  the first land being arranged to control a first fluid pressure exhaust passage leading from the first undercut section of the metering spool valve; and
  a second undercut section defined by a second land;
  the second land being arranged to control a second fluid pressure exhaust passage leading from the second undercut section of the metering spool valve;
  said first land having a first passageway therethrough extending from the first chamber through said first land to said first undercut section;
  said second land having a second passageway extending therethrough from said second chamber to said second undercut section;
  the metering spool valve being movable in one direction from a position closing said first exhaust passage to a position allowing fluid passage to the first exhaust passage; and
  the metering spool valve being movable in an opposite direction from a position closing said second exhaust passage to a position allowing fluid passage to the second exhaust passage.

References Cited

UNITED STATES PATENTS

| | | | |
|---|---|---|---|
| 2,790,427 | 4/1957 | Carson | 137—625.61 |
| 2,861,550 | 11/1958 | Hanna | 137—596.16 X |
| 3,167,632 | 1/1965 | O'Connor | 137—625.61 X |
| 3,275,017 | 9/1966 | Henry | 137—625.6 X |

FOREIGN PATENTS

| | | |
|---|---|---|
| 839,557 | 6/1960 | Great Britain. |

ALAN COHAN, *Primary Examiner.*

U.S. Cl. X.R.

91—365; 137—625.6